United States Patent
Sato et al.

(10) Patent No.: US 9,105,931 B2
(45) Date of Patent: *Aug. 11, 2015

(54) POSITIVE ELECTRODE PLATE FOR USE IN LITHIUM ION SECONDARY BATTERY, LITHIUM ION SECONDARY BATTERY, VEHICLE, DEVICE WITH BATTERY MOUNTED THEREON, AND METHOD FOR PRODUCING POSITIVE ELECTRODE PLATE FOR LITHIUM ION SECONDARY BATTERY

(75) Inventors: Takayasu Sato, Toyota (JP); Yuichiro Imamura, Miyoshi (JP); Yuki Matsushita, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/520,241

(22) PCT Filed: Jan. 8, 2010

(86) PCT No.: PCT/JP2010/050184
§ 371 (c)(1),
(2), (4) Date: Jul. 2, 2012

(87) PCT Pub. No.: WO2011/083585
PCT Pub. Date: Jul. 14, 2011

(65) Prior Publication Data
US 2013/0122359 A1    May 16, 2013

(51) Int. Cl.
*H01M 4/66* (2006.01)
*H01M 4/13* (2010.01)
(Continued)

(52) U.S. Cl.
CPC ............ *H01M 4/663* (2013.01); *H01M 4/13* (2013.01); *H01M 4/661* (2013.01); *H01M 4/667* (2013.01); *H01M 4/80* (2013.01); *H01M 10/0525* (2013.01); *H01M 10/0561* (2013.01);
(Continued)

(58) Field of Classification Search
None
See application file for complete search history.

(56) References Cited

U.S. PATENT DOCUMENTS 5,573,554 A * 11/1996 Fauteux et al. ............ 29/623.5
2002/0150820 A1 * 10/2002 Kanai et al. ............. 429/231.1
(Continued)

FOREIGN PATENT DOCUMENTS

CN      1827845        9/2006
CN      101082118 A    12/2007
(Continued)

OTHER PUBLICATIONS

International Search Report in International Application No. PCT/JP2010/050184; Mailing Date: Apr. 13, 2010.
(Continued)

*Primary Examiner* — Patrick Ryan
*Assistant Examiner* — Haixia Zhang
(74) *Attorney, Agent, or Firm* — Finnegan, Henderson, Farabow, Garrett & Dunner, LLP

(57) ABSTRACT

A positive electrode plate for a lithium ion secondary battery is made of aluminum and includes a positive current collecting foil made of aluminum, in which at least a main surface portion constituting a main surface is porous, a positive active material layer formed on the main surface portion of the positive current collecting foil, and a coating layer, having electrical conductivity and corrosion resistance, formed between the positive current collecting foil and the positive active material layer to directly coat the main surface of the positive current collecting foil.

8 Claims, 12 Drawing Sheets

(51) Int. Cl.
  *H01M 4/80* (2006.01)
  *H01M 10/0525* (2010.01)
  *H01M 10/0561* (2010.01)
  *H01M 4/131* (2010.01)
  *H01M 4/02* (2006.01)

(52) U.S. Cl.
  CPC ......... *H01M4/131* (2013.01); *H01M 2004/028* (2013.01); *Y02E 60/122* (2013.01); *Y02T 10/7011* (2013.01)

(56) References Cited

U.S. PATENT DOCUMENTS

| | | | |
|---|---|---|---|
| 2003/0090021 A1* | 5/2003 | Kise et al. | 264/113 |
| 2005/0048371 A1 | 3/2005 | Nagayama et al. | |
| 2006/0076243 A1 | 4/2006 | Aoyama et al. | |
| 2006/0134501 A1 | 6/2006 | Lee et al. | |
| 2006/0222953 A1* | 10/2006 | Inoue et al. | 429/232 |
| 2008/0131779 A1 | 6/2008 | Kami et al. | |
| 2010/0086857 A1* | 4/2010 | Higuchi et al. | 429/231.95 |
| 2011/0111290 A1 | 5/2011 | Uchida et al. | |

FOREIGN PATENT DOCUMENTS

| | | |
|---|---|---|
| JP | 6-302477 | 10/1994 |
| JP | 7-297089 | 11/1995 |
| JP | 8-64203 | 3/1996 |
| JP | 08088024 A * | 4/1996 |
| JP | 10-106585 | 4/1998 |
| JP | 11-250900 | 9/1999 |
| JP | 2000-149924 | 5/2000 |
| JP | 2000-231923 | 8/2000 |
| JP | 2000-243383 | 9/2000 |
| JP | 2000-348710 | 12/2000 |
| JP | 2002-373644 | 12/2002 |
| JP | 2003-224036 | 8/2003 |
| JP | 2005-78991 | 3/2005 |
| JP | 2005-294168 | 10/2005 |
| JP | 2006-155900 | 6/2006 |
| JP | 2007-42413 | 2/2007 |
| JP | 2007-109454 | 4/2007 |
| JP | 2007-305453 | 11/2007 |
| JP | 2008-153118 | 7/2008 |
| JP | 2008-160053 | 7/2008 |
| JP | 2009-123346 | 6/2009 |
| JP | 2009-170132 | 7/2009 |
| JP | 2009-252396 | 10/2009 |
| JP | 2009-259634 | 11/2009 |
| JP | 2009-283232 | 12/2009 |
| JP | 2010-21075 | 1/2010 |
| JP | 2010-212167 | 9/2010 |
| JP | 2010-262866 | 11/2010 |
| WO | WO 2005/003404 | 1/2005 |
| WO | WO 2007077870 A1 * | 7/2007 |
| WO | WO 2009069250 A1 * | 6/2009 |

OTHER PUBLICATIONS

Election/Restriction for U.S. Appl. No. 13/002,665 dated Apr. 3, 2013.
Office Action for U.S. Appl. No. 13/002,665 dated Aug. 13, 2013.
Notice of Allowance and Fee(s) Due for U.S. Appl. No. 13/002,665 dated Mar. 12, 2014.

* cited by examiner

POSITIVE ELECTRODE PLATE FOR USE IN LITHIUM ION SECONDARY BATTERY, LITHIUM ION SECONDARY BATTERY, VEHICLE, DEVICE WITH BATTERY MOUNTED THEREON, AND METHOD FOR PRODUCING POSITIVE ELECTRODE PLATE FOR LITHIUM ION SECONDARY BATTERY

CROSS-REFERENCE TO RELATED APPLICATIONS

This application is a national phase application of International Application No. PCT/JP2010/050184, filed Jan. 8, 2010, the content of which is incorporated herein by reference.

TECHNICAL FIELD

The invention relates to a positive electrode plate well adapted for use in a lithium ion secondary battery (a positive electrode plate for a lithium ion secondary battery), a lithium ion secondary battery, a vehicle and a battery-mounting device which use such a battery, and a method of manufacturing a positive electrode plate for a lithium ion secondary battery.

BACKGROUND ART

With the recent popularization of portable electronics such as cellular phones, notebook-sized personal computers and video camcorders as well as vehicles such as hybrid electric cars, a demand for batteries for use in the driving power sources of those devices and vehicles is growing.

As the batteries used in such applications, lithium ion secondary batteries (hereinafter referred to as "batteries") are widely known which use a positive electrode plate for a lithium ion secondary battery (hereinafter referred to as "positive electrode plate"), the positive electrode plate having positive active material layers laid over the main surfaces, respectively, of a positive current collecting foil made of aluminum.

For example, Patent Literature 1 discloses a battery using a positive electrode (a positive electrode plate) in which active material layers (positive active material layers) containing active material are formed on a current collector (a positive current collecting foil). This current collector is made of aluminum and has surfaces (main surfaces) which have been made porous by AC etching. This battery is able to exhibit good charge/discharge properties because it can retain electrolyte in the holes of the current collector (the positive current collecting foil).

RELATED ART DOCUMENTS

Patent Documents

Patent Literature 1: JP2005-294168A

DISCLOSURE OF THE INVENTION

Problems to be Solved by the Invention

The battery disclosed in Patent Literature 1 however entails undesirable formation of aluminum oxide layers, as passive layers, on the main surfaces of the positive current collecting foil made of aluminum when exposed to the atmosphere. Therefore, even though the positive active material layers are formed on the positive current collecting foil, the aluminum oxide layers are interposed between the positive active material layers and the positive current collecting foil, which leads to a decrease in electrical conductivity between them.

Further, the aluminum oxide layers formed as passive layers do not have sufficient corrosion resistance, and therefore if the electrolyte stored in the battery comes into contact with the positive current collecting foil, the positive current collecting foil would be eroded irrespective of the presence of the aluminum oxide layers. And, if the corrosion of the positive current collecting foil progresses during service of the battery, the positive active material layers formed on the positive current collecting foil will peel off or separate from the positive current collecting foil, resulting in a gradual decrease in the capacity of the battery.

The present invention has been made in view of the foregoing problem and a primary object of the invention is therefore to provide a positive electrode plate for use in a lithium ion secondary battery which is capable of preventing a decrease in electrical conductivity between the positive current collecting foil and the positive active material layers as well as peel-off of the positive active material layers, thereby preventing a decrease in battery capacity over time. Another object of the invention is to provide a lithium ion secondary battery including the above positive electrode plate, and a vehicle and a battery-mounting device that are equipped with this lithium ion secondary battery, and to provide a method of manufacturing the positive electrode plate for a lithium ion secondary battery.

Means of Solving the Problems

According to one aspect of the invention, there is provided a positive electrode plate for a lithium ion secondary battery, the positive electrode plate comprising: a positive current collecting foil made of aluminum, in which at least a main surface portion constituting a main surface is porous; and a positive active material layer containing positive active material particles and being formed on the main surface portion of the positive current collecting foil, wherein a coating layer, having electrical conductivity and corrosion resistance, is formed between the positive current collecting foil and the positive active material layer to directly coat the main surface of the positive current collecting foil without interposition of an aluminum oxide layer made of aluminum oxide.

In the above positive electrode plate for a lithium ion secondary battery, the coating layer having electrical conductivity and corrosion resistance is formed between the positive current collecting foil and the positive active material layer without interposition of an aluminum oxide layer so as to directly coat the main surface of the positive current collecting foil. Therefore, the main surface portion of the positive current collecting foil can be prevented from being eroded by the electrolyte containing lithium ions. Therefore, in cases where the above positive electrode plate is used in a battery, peel-off and separation of the positive active material layer from the positive current collecting foil can be avoided so that a decrease in the capacity of the battery over time caused by the peel-off and separation can be prevented.

In addition, since the coating layer exhibits electrical conductivity, electrons can be exchanged at low resistance between the positive active material particles contained in the positive active material layer formed on the main surface portion of the positive current collecting foil and the positive current collecting foil. Therefore, the above positive electrode plate has lower resistance than positive electrode plates having an aluminum oxide layer between the positive active material layer and the positive current collecting foil. Additionally, use of such a positive electrode plate in a battery enables the battery to have low battery resistance (battery internal resistance).

Examples of the material of the coating layer having electrical conductivity and corrosion resistance include precious metals such as gold and platinum, and electrically-conductive ceramics constituted by at least a carbide or oxide of a substance selected from the group consisting of: tungsten, tantalum, hafnium, niobium, molybdenum and vanadium.

In cases where the coating layer is made of an electrically-conductive ceramic, its electrical conductivity may be, for example, 17 $\mu\Omega$·cm (tungsten carbide (chemical formula: WC)), 0.31 $\mu\Omega$·cm (tantalum carbide (TaC)), 0.26 $\mu\Omega$·cm (hafnium carbide (HfC)), 0.10 $\mu\Omega$·cm (niobium carbide (NbC)), 0.09 $\mu\Omega$·cm (molybdenum carbide ($Mo_2C$)) or 0.05 $\mu\Omega$·cm (vanadium carbide (VC)). Further, it may be 0.88 $\mu\Omega$·cm (tungsten oxide ($WO_3$)), 0.92 $\mu\Omega$·cm (tantalum oxide ($Ta_2O_5$)), 1.01 $\mu\Omega$·cm (hafnium oxide ($HfO_2$)), 0.83 $\mu\Omega$·cm (niobium oxide (NbO)), 0.78 $\mu\Omega$·cm (molybdenum oxide ($MoO_3$)) or 1.11 $\mu\Omega$·cm (vanadium oxide (VO)).

In cases where the coating layer is made of a precious metal, its electrical conductivity may be, for example, 0.24 $n\Omega$·cm (gold (Au)) or 1.05 $n\Omega$·cm (platinum (Pt)).

As the above-mentioned positive active material particles, particles of a positive active material suited for a battery system to be constructed may be used. Examples of such particles include particles of lithium-containing layered oxides such as $LiCoO_2$, $LiNiO_2$, $LiMn_2O_4$, $LiMnO_2$, $LiCo_{0.5}Ni_{0.5}O_2$, $LiNi_{0.7}Co_{0.2}Mn_{0.1}O_2$ and olivine—based oxides such as $LiFePO_4$.

As the method for coating the main surface of the positive current collecting foil with the coating layer, vapor-phase growth techniques such as sputtering may be employed.

In the above-described positive electrode plate for a lithium ion secondary battery, the coating layer may consist of tungsten carbide.

This positive electrode plate has the coating layer consisting of tungsten carbide having electrical conductivity, which ensures that this positive electrode plate exhibits lower resistance than positive electrode plates having an aluminum oxide layer between the positive active material layer and the positive current collecting foil. In addition, this positive electrode plate is inexpensive compared to positive electrode plates having a coating layer composed of a precious metal.

Since tungsten carbide has high corrosion resistance to lithium ions, the positive electrode plate will not be easily eroded but can exhibit good corrosion resistance even if the positive electrode plate, in contact with the lithium ion containing electrolyte, is held at a positive potential.

Further, since tungsten carbide has hydrophilicity, if a water-based paste-like solvent is used in the manufacture of the positive electrode plate containing positive active material particles dispersed therein, the paste will not be repelled but securely applied onto the coating layer.

Examples of the tungsten carbide employed in the invention include WC and $W_3C$.

In any of the above-described positive electrode plates for a lithium ion secondary battery, a diamond-like carbon film may be directly formed on the coating layer.

This positive electrode plate has a diamond-like carbon film (hereinafter referred to as "DLC film") directly formed on the coating layer and therefore exhibits more improved corrosion resistance.

It is difficult to directly form the DLC film on the main surface of the positive current collecting foil because of the weak adhesion between the positive current collecting foil and the DLC film. However, the DLC film can be firmly adhered to the positive current collecting foil, for example, by inserting the coating layer composed of tungsten carbide or the like, so that the positive electrode plate can exhibit stable corrosion resistance.

The DLC film is a hard film that consists of carbon or hydrocarbon and has SP2/SP3 bonds.

Preferably, the diamond-like carbon film of the above positive electrode plate for a lithium ion secondary battery has a thickness of 0.5 to 100 nm.

Since the DLC film of the above positive electrode plate is as thin as 0.5 to 100 nm and therefore easy to form, the provision of the DLC film has no influence upon stress (does not involve crimp formation), which contributes to a reduction in the cost of the positive electrode plate.

According to another aspect of the invention, there is provided a lithium ion secondary battery comprising: a power generating element having the positive electrode plate for a lithium ion secondary battery; and an electrolyte including lithium ions.

In the above battery, since the power generating element is provided with the above-described positive electrode plate, the main surface of the positive current collecting foil will not be eroded even if the positive electrode plate comes into contact with the lithium-ion-containing electrolyte within the battery. This enables it to avoid peel-off and separation of the positive active material layer from the positive current collecting foil, the peel-off and separation occurring in association with corrosion within the battery. As a result, the battery can exhibit the capability of preventing a decrease in battery capacity over time caused by corrosion (and by the subsequent peel-off and separation of the positive active material layer).

In addition, since the positive electrode plate employed in the battery has lower resistance than positive electrode plates having an aluminum oxide layer between the positive active material layer and the positive current collecting foil, the battery can exhibit low battery resistance.

Examples of the power generating element stated above include wound-type power generating elements stacked-type power generating elements. In the wound-type power generating elements, strip-shaped positive and negative electrode plates and a strip-shaped separator are wounded around a winding shaft. In the stacked-type power generating elements, the positive electrode plate and the negative electrode plate are alternately stacked with the separator interposed therebetween.

In the above lithium ion secondary battery, the positive active material layer may have a thickness of 35 to 75 $\mu$m.

The inventors carried on research, using batteries A and B. The battery A has a positive electrode plate in which a positive current collecting foil (normal aluminum foil) made of aluminum is employed and its main surface portion is not porous but flat. And, a passive layer (i.e., aluminum oxide layer) is formed on the main surface and a positive active material layer is laid over the passive layer. The inventors have found that, in this battery A, the output ratio of the battery decreases as the thickness of the positive active material layer increases after exceeding 30 $\mu$m. It should be noted the above output ratio is calculated with the output (explained later) of a battery, which has a positive electrode plate including a 30 $\mu$m-thick positive active material layer, being set to 100%. It has also been found that, in the battery B using a positive electrode plate which includes a positive current collecting foil having a porous main surface, a positive active material layer formed on the main surface, and a coating layer formed between the foil and the active material layer, the output ratio of the battery does not substantially vary but is kept at around 100% even when the positive active material layer is made thicker than 30 µm.

The above fact means that the output of the battery B is higher than that of the battery A when the positive active material layers of the batteries A and B have the same thickness exceeding 30 µm. In addition, the difference in output between the batteries A and B becomes greater as the thicknesses of their positive active material layers are increased (exceeding 30 µm).

It has also been found that when the positive active material layers of the batteries A, B are 35 µm or more in thickness, the output of the battery B is 10% or more higher than that of the battery A. This means that when forming a relatively thick positive active material layer having a thickness of 35 µm or more on a positive current collecting foil, the output of the battery can be more significantly increased (by 10% or more) than the output of batteries having a passive layer formed on the non-porous flat main surface of the positive current collecting foil, by making the main surface portion of the positive current collecting foil porous and forming a coating layer on this main surface portion.

If the thickness of the positive active material layer is made greater than 75 µm, the positive active material layer itself is apt to be cracked by the stress occurring during formation and handling of the positive active material layer.

In view of the above knowledge, the thickness of the positive active material layer is set to a value within the range of from 35 to 75 µm in the above-described battery. This significantly increases the output of the above-described battery, compared to batteries having a positive electrode plate in which a positive active material layer having the same thickness is formed on a positive current collecting foil which includes a passive layer formed atop a non-porous, flat main surface thereof.

In addition, in the above-described battery, even if the thickness of the positive active material layer varies within the range stated above, the output of the battery does not substantially fluctuate. Therefore, the performance (battery capacity and output) of the battery can be maintained even if the area coated by the positive active material layer is reduced while increasing the thickness of the layer such that the amount of positive active material particles used in the battery is not changed. As a result, the area of the positive current collecting foil and the coating layer can be saved in the amount corresponding to the reduction in the area of the positive active material layer so that the weight and cost of the battery can be suppressed while lowering the resistance of the battery.

Further, cracking of the positive active material layer due to the stress occurring during manufacture of the battery can be prevented.

According to another aspect of the invention, there is provided a vehicle equipped with the aforementioned lithium ion secondary battery, the vehicle being configured to use electric energy stored in the lithium ion secondary battery as the whole of or part of a driving power source.

The above-described vehicle has good travelling properties because the vehicle is equipped with the battery which has low battery resistance and is capable of controlling a decrease in battery capacity over time.

The above vehicle may be any types of vehicles as long as they are designed to use electric energy from the battery as the whole of or part of the driving power source. Examples of such vehicles include electric vehicles, hybrid vehicles, plug-in hybrid vehicles, hybrid railroad vehicles, forklifts, electric wheelchairs, electric bicycles and electric scooters.

According to another aspect of the invention, there is provided a battery-mounting device equipped with the aforementioned lithium ion secondary battery, the battery-mounting device being configured to use electric energy stored in the lithium ion secondary battery as the whole of or part of a driving energy source.

The above-described battery-mounting device has a driving energy source having stable performance because the battery-mounting device is equipped with the battery which has low battery resistance and is capable of controlling a decrease in battery capacity over time.

The battery-mounting device may be any types of devices as long as they have a battery and utilize this battery as the whole of or part of the energy source. Examples of such devices include personal computers; cellular phones; battery-driven electric tools, permanent power supply systems, various battery-driven household electric appliances; office equipment and industrial equipment.

According to another aspect of the invention, there is provided a method of manufacturing a positive electrode plate for a lithium ion secondary battery, the positive electrode plate comprising: a positive current collecting foil made of aluminum, in which at least a main surface portion constituting a main surface is porous; a positive active material layer containing positive active material particles and being formed on the main surface portion of the positive current collecting foil; and a coating layer, having electrical conductivity and corrosion resistance, being formed between the positive current collecting foil and the positive active material layer to directly coat the main surface of the positive current collecting foil without interposition of an aluminum oxide layer made of aluminum oxide, the method comprising the step of directly coating the main surface of the positive current collecting foil with the coating layer which main surface does not have an aluminum oxide layer formed thereon.

According to the above-described method of manufacturing a positive electrode plate for a lithium ion secondary battery, the main surface portion of the positive current collecting foil, on which no aluminum oxide layer is formed, is directly coated with the coating layer. Therefore, it becomes possible to manufacture a positive electrode plate in which a coating layer having electrical conductivity and corrosion resistance is formed between the positive current collecting foil and the positive active material layer without interposition of an aluminum oxide layer so as to directly coat the main surface of the positive current collecting foil. More specifically, it is possible to produce a positive electrode plate capable of controlling a decrease in battery capacity over time that occurs owing to corrosion of the positive current collecting foil (and the subsequent peel-off and separation of the positive active material layer) and exhibiting lower resistance than positive electrode plates that have an aluminum oxide layer interposed between the positive active material layer and the positive current collecting foil.

As the coating process, any techniques may be employed as long as they can apply the coating layer while preventing oxidation of the main surface of the positive current collecting foil (i.e., formation of an aluminum oxide layer). Examples of such techniques include physical vapor deposition (PVD) methods such as sputtering, vacuum deposition and ion plating and chemical vapor deposition methods (vapor phase epitaxial methods) such as CVD. In particular, sputtering is preferable because it provides higher film formation speed compared to other techniques. It is also possible to coat the main surface of the positive current collecting foil with the coating layer made of precious metal or the like, by

DESCRIPTION OF THE REFERENCE SIGNS

1 Battery (Lithium ion secondary battery)
10 Power generating element
20 Positive electrode plate (Positive electrode plate for lithium ion secondary battery)
21A First positive active material layer (Positive active material layer)
21B Second positive active material layer (Positive active material layer)
22 Positive active material particle
23 Aluminum foil (Positive current collecting foil)
23A First aluminum main surface (Main surface)
23B Second aluminum main surface (Main surface)
25A First aluminum main surface portion (Main surface portion)
25B Second aluminum main surface portion (Main surface portion)
28A First coating layer (Coating layer)
28B Second coating layer (Coating layer)
29A First DLC film (Diamond-like carbon film)
29B Second DLC film (Diamond-like carbon film)
50 Electrolyte
200 Vehicle
300 Hammer drill (Battery-mounting device)
TD Film thickness (of diamond-like carbon film)
TM Film thickness (of positive active material layer)

MODE FOR CARRYING OUT THE INVENTION

First Embodiment

Referring now to the accompanying drawings, the invention will be described according to a first embodiment.

Figure 1:
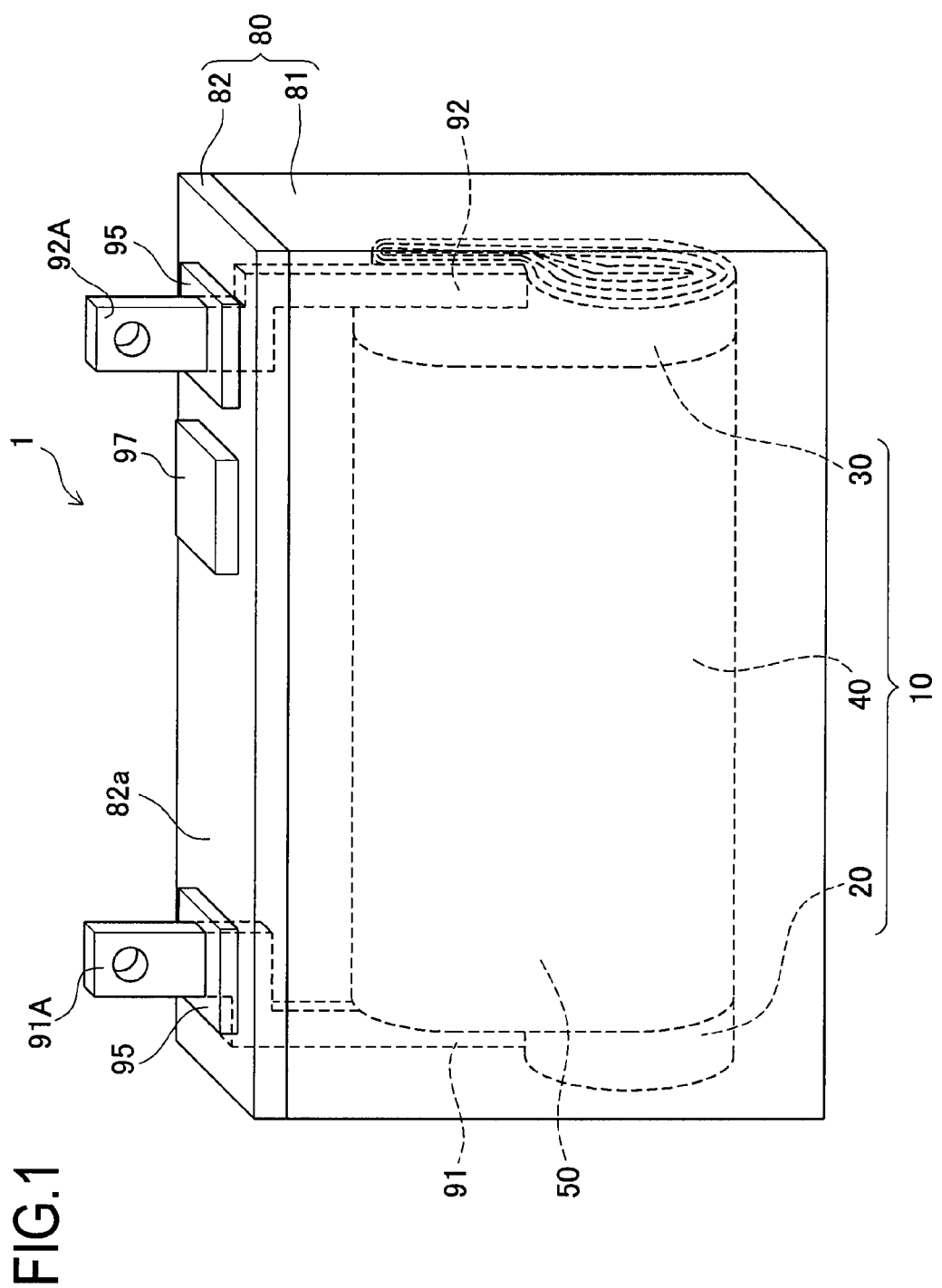
FIG. 1 is a perspective view of a battery in a first embodiment.
Figure 2:
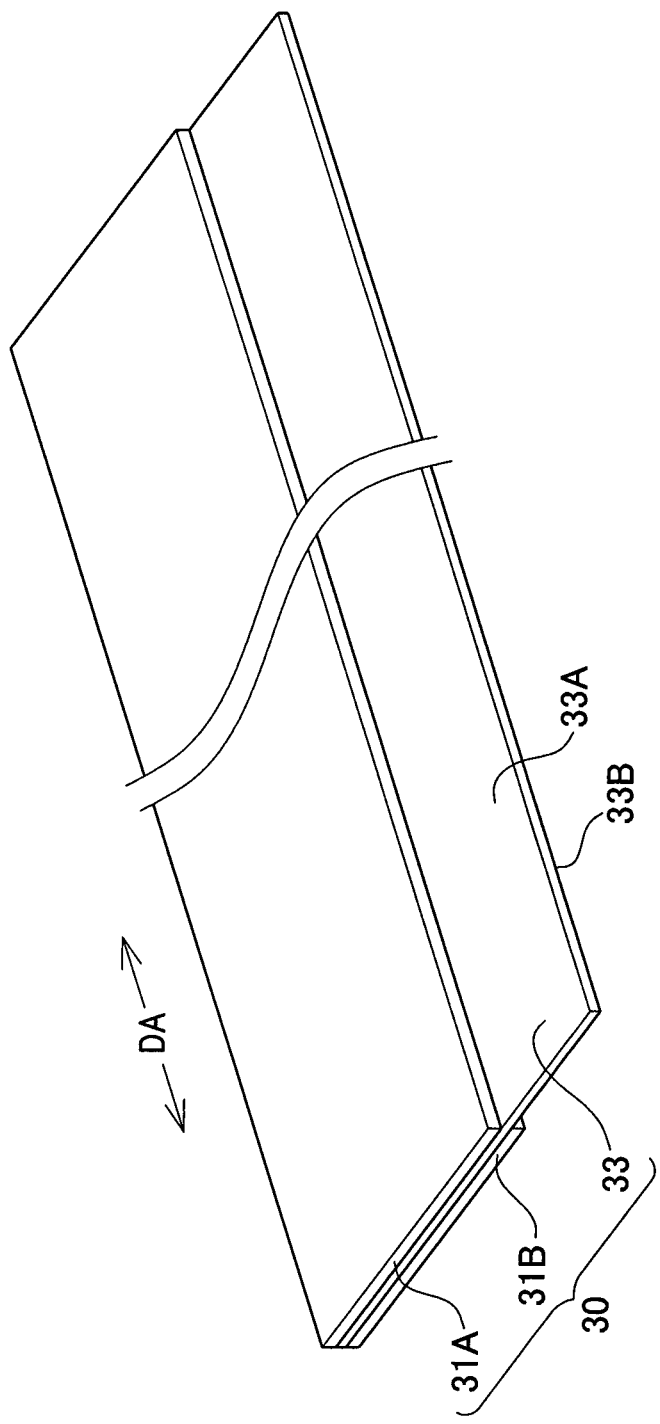
FIG. 2 is a perspective view of a negative electrode plate in the first embodiment.

Reference is made to FIGS. 1 and 2 to describe a battery 1 having a positive electrode plate 20 according to the first embodiment.

The battery 1 is a lithium ion secondary battery having a wound power generating element 10 and an Li-containing electrolyte 50. The power generating element 10 includes the positive electrode plate 20, a negative electrode plate 30 and a separator 40 which have the shape of a strip extending in a longitudinal direction DA and are wounded up (see FIG. 1). The battery 1 houses the power generating element 10 and the electrolyte 50 within a battery case 80 (see FIG. 1).

Of these components, the battery case 80 has a battery case body 81 and a sealing lid 82 both of which are made of aluminum. The battery case body 81 is in the form of a rectangular box with a bottom, and an insulating film (not shown), made from resin and bent into box form, is interposed between the battery case 80 and the power generating element 10. The sealing lid 82 is in the form of a rectangular plate and welded to the battery case body 81 so as to close the opening of the battery case body 81. A positive terminal 91A and a negative terminal 92A are located on the leading ends, respectively, of a positive current collector 91 and a negative current corrector 92 which are connected to the power generating element 10. These terminals 91A and 92A pass through the sealing lid 82, projecting from a lid surface 82a that faces upward in FIG. 1. Further, an insulating member 95 made from insulating resin is interposed between the positive terminal 91A and the sealing lid 82 and between the negative terminal 92A and the sealing lid 82 to insulate them. Further, the sealing lid 82 is provided with a rectangular-plate shaped safety valve 97 attached thereto in a sealing manner.

The electrolyte 50 is an organic electrolyte containing lithium ions in a concentration of 1 mol/l and prepared by adding a solvent ($LiPF_6$) to a mixed organic solute consisting of ethylene carbonate (EC) and ethyl methyl carbonate (EMC). The separator 40 of the power generating element 10 is impregnated with this electrolyte 50.

The power generating element 10 is of the wound type and formed such that the strip-shaped positive and negative electrode plates 20, 30 are wound up into flat shape with the strip-shaped separator 40 made from polyethylene inserted therebetween (see FIG. 1). In the outermost and innermost sides of the power generating element 10, only the separator 40 is wounded. The positive electrode plate 20 and negative electrode plate 30 of the power generating element 10 are welded to the positive current collector 91 and the negative current collector 92 respectively, the current collectors 91, 92 having the shape of a plate bent into crank form (see FIG. 1).

As shown in FIG. 2, the thin-plate-like negative electrode plate 30 of the power generating element 10 has a strip-shaped copper foil 33 that is made of copper and extends in the longitudinal direction DA and strip-shaped negative active material layers (a first negative active material layer 31A and second negative active material layer 31B) that are formed on the main surfaces (a first copper main surface 33A and second copper main surface 33B), respectively, of the copper foil 33.

The negative active material layers 31A and 31B contain negative active material particles consisting of graphite and a binding material consisting of PVDF (both are not shown).

Figure 3:
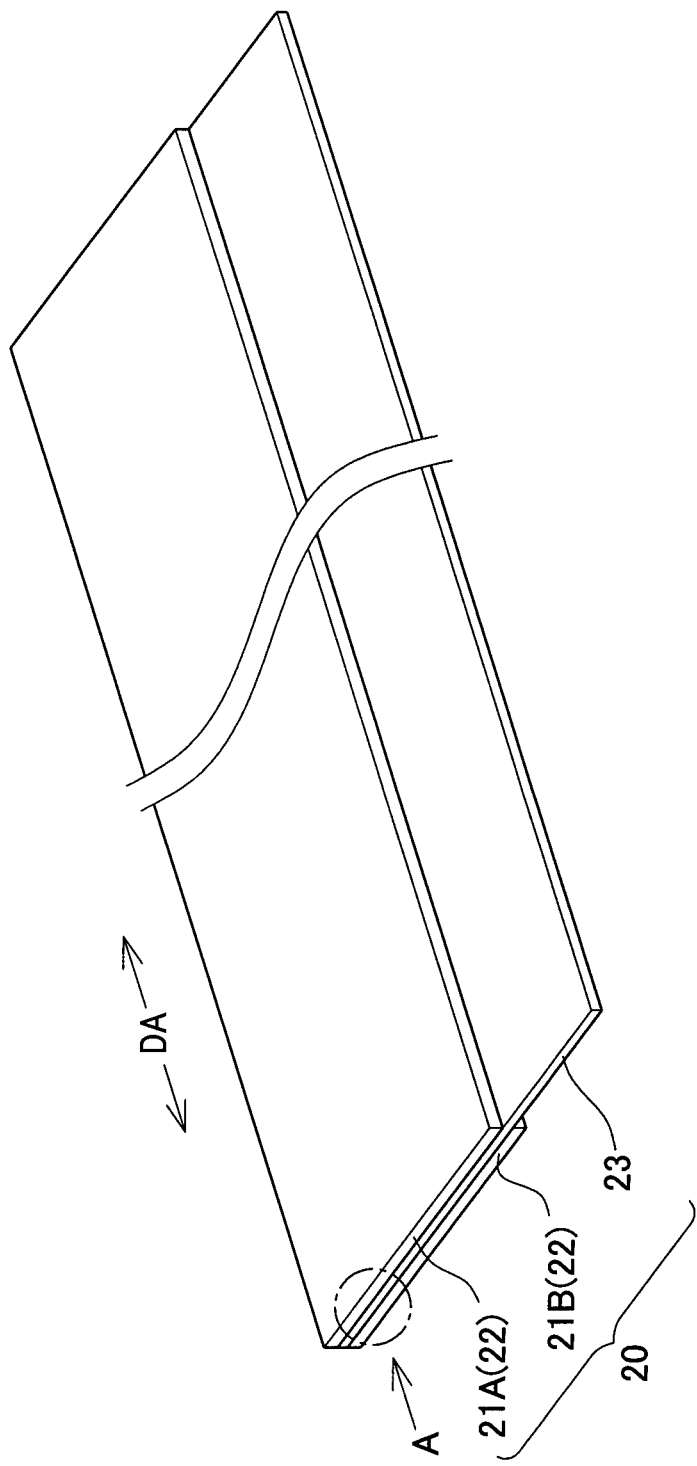
FIG. 3 is a perspective view of a positive electrode plate in the first embodiment.

As shown in FIG. 3, the thin-plate-like positive electrode plate 20 has an aluminum foil 23 that is made of aluminum and extends in the longitudinal direction DA and two strip-shaped positive active material layers (a first positive active material layer 21A and a second positive active material layer 21B described later) that are formed on the main surface portions (a first aluminum main surface portion 25A and a second aluminum main surface portion 25B) respectively, these main surface portions constituting the main surfaces (a first aluminum main surface 23A and a second aluminum main surface 23B) of the aluminum foil 33.

Figure 4:
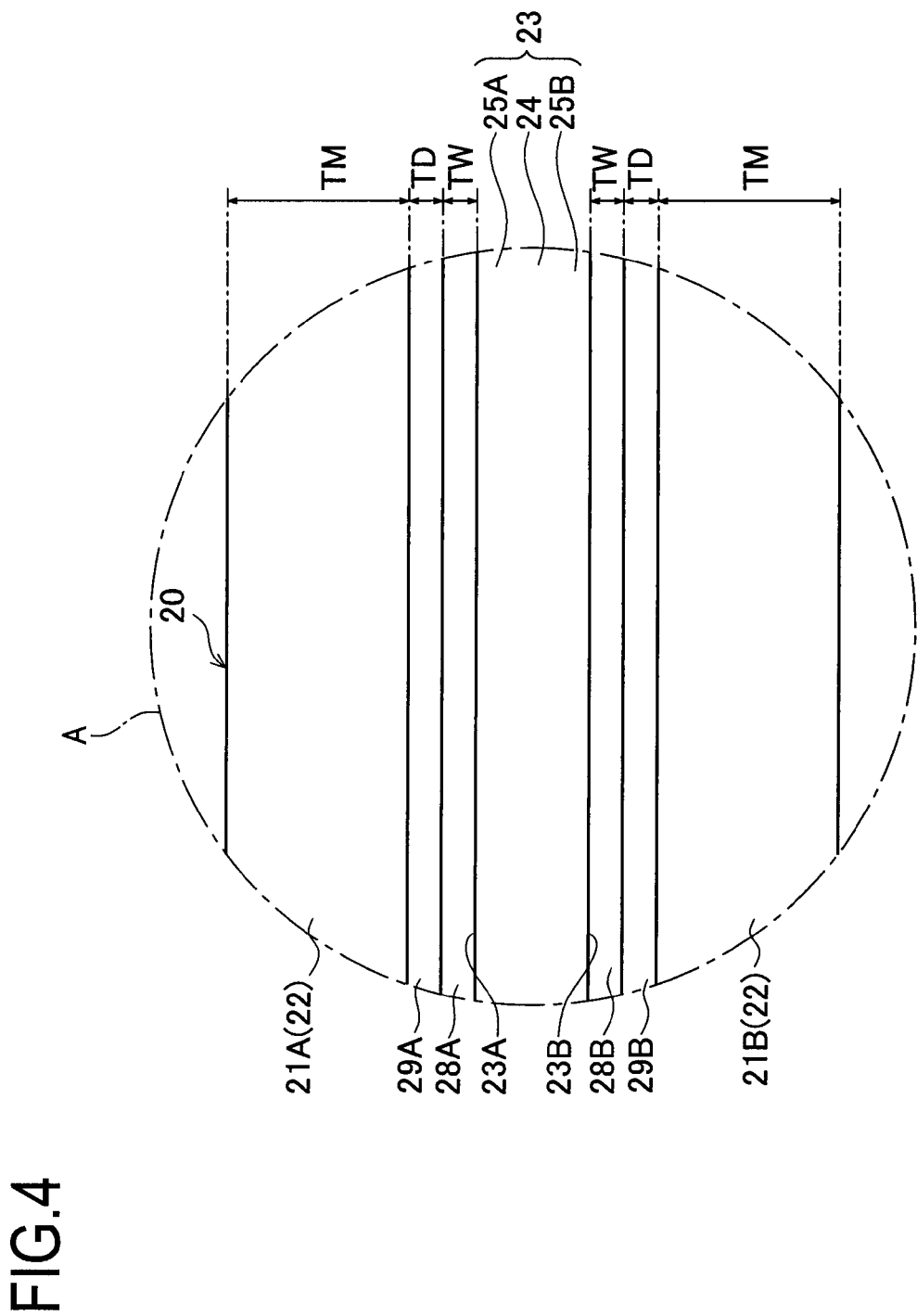
FIG. 4 is an enlarged view of an end face of the positive electrode plate, i.e., Part A in FIG. 3, in the first embodiment.
Figure 5:
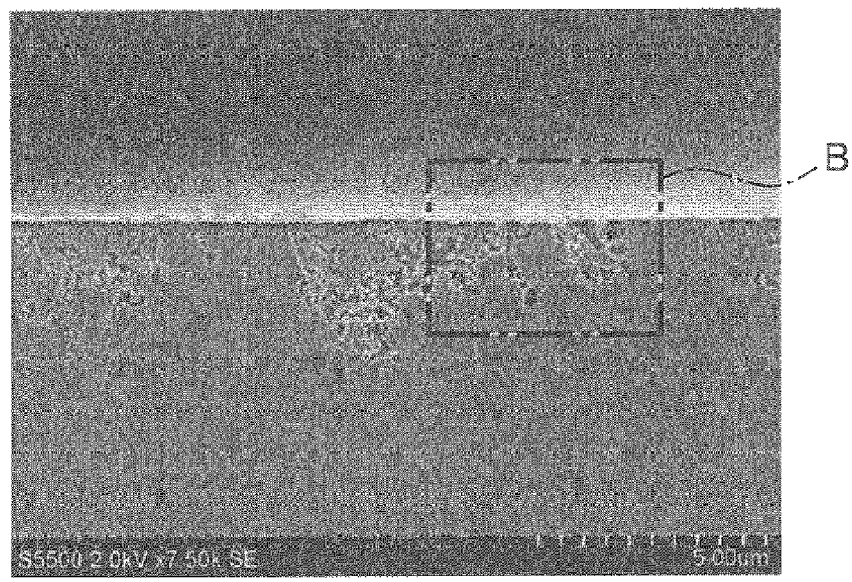
FIG. 5 is a photograph showing partial enlarged cross-section of a positive current collecting foil in the first embodiment.
Figure 6:
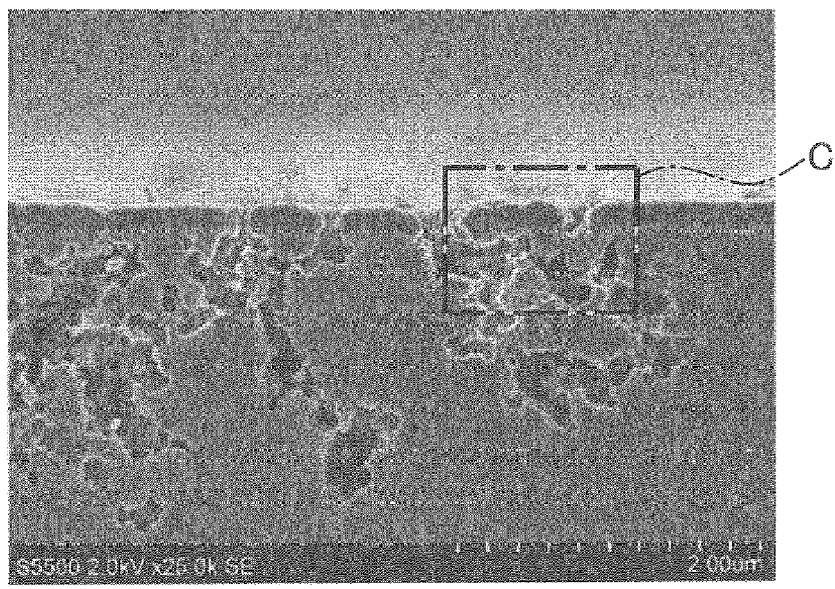
FIG. 6 is another photograph showing partial enlarged cross-section of the positive current collecting foil in the first embodiment.
Figure 7:
FIG. 7 is another photograph showing partial enlarged cross-section of the positive current collecting foil in the first embodiment.
Figure 8:
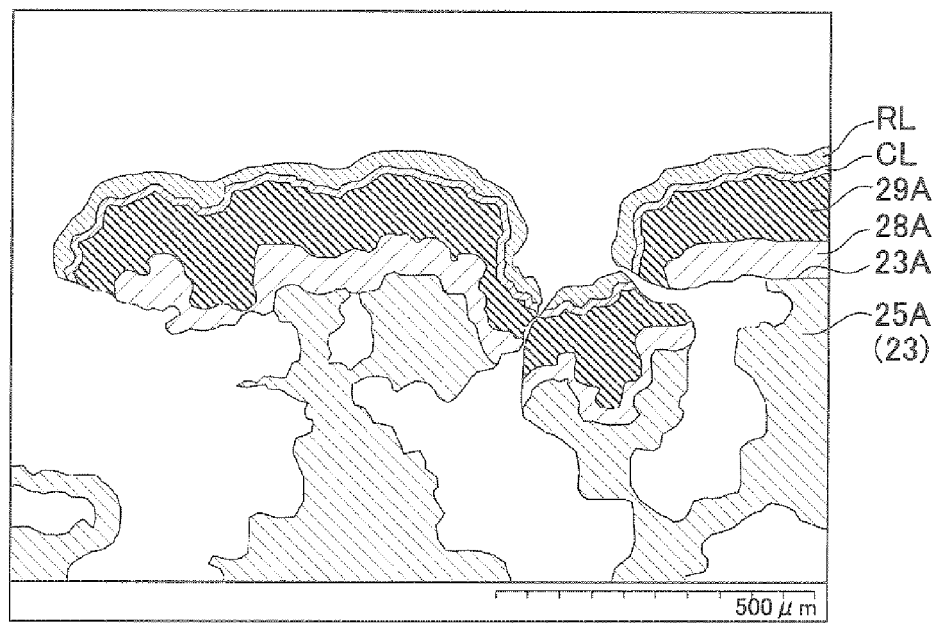
FIG. 8 is a partial enlarged cross-sectional view (showing the same portion as in FIG. 7) of the positive current collecting foil in the first embodiment.

This positive electrode plate 20 will be described with reference to FIG. 4 that is the enlarged view of an end face (corresponding Part A in FIG. 3), FIG. 5 that is a photograph showing partial enlarged cross-section (a secondary electron image) taken by an electric microscope (a scanning electron microscope (SEM)), FIG. 6 that is a photograph showing an enlarged cross-section (a secondary electron image corresponding Part B in FIG. 5) taken by an SEM, FIG. 7 that is a photograph showing an enlarged cross-section (a reflection electron image corresponding Part C in FIG. 6) taken by an SEM, and FIG. 8 that is an enlarged cross-sectional view (corresponding to Part C in FIG. 6). The positive electrode plate 20 has, as shown in FIGS. 4, 7 and 8, a first coating layer 28A disposed between the aluminum foil 23 and the first positive active material layer 21A so as to directly coat the first aluminum main surface 23A. Disposed between the aluminum foil 23 and the second positive active material layer 21B is a second coating layer 28B that directly coats the second aluminum main surface 23B (see FIG. 4). A first DLC film 29A and a second DLC film 29B, which are made from diamond-like carbon, are directly formed on the first coating layer 28A and the second coating layer 28B respectively (see FIGS. 4, 7, 8).

Formed on the first DLC film 29A are a carbon vapor-deposition layer CL and a redeposition layer RL (see FIGS. 7, 8). The carbon vapor-deposition layer CL is for imparting electrical conductivity to the surface of the aluminum foil 23 having the insulating first DLC film 29A when the aluminum foil 23 is observed, using an SEM. The redeposition layer RL is a layer to which chips generated from the aluminum foil 23 are reattached when preparing a cross-sectional sample to be observed by an SEM. None of them are the constituents of the positive electrode plate 20 of the first embodiment.

The aluminum foil 23 made of aluminum has the first aluminum main surface portion 25A (see FIGS. 4 to 8) and the second aluminum main surface portion 25B (see FIG. 4) both of which are porous and a solid foil central portion 24 (see FIGS. 4, 5) which is located between the first aluminum main surface portion 25A and the second aluminum main surface portion 25B.

The first aluminum main surface 23A of the aluminum foil 23 is directly coated with the first coating layer 28A without interposition of an aluminum oxide layer therebetween. Also, the second aluminum main surface 23B is directly coated with the second coating layer 28B similarly to the first aluminum main surface 23A without interposition of an aluminum oxide layer therebetween.

If metal aluminum is left to stand in the atmosphere, a very thin (about 5 nm-thick) passive film (an aluminum oxide layer) will be formed on its surface owing to its inherent characteristics. In the formation of the positive electrode plate 20 according to the first embodiment, the porous first and second aluminum main surface portions 25A and 25B are formed by applying an AC etching treatment (described later) to the aluminum foil. In this treatment, the aluminum oxide layers formed on the main surfaces of the aluminum foil are removed so that metal aluminum is exposed on the aluminum main surfaces 23A, 23B.

In the positive electrode plate 20 of the first embodiment, the aluminum main surfaces 23A, 23B of the aluminum foil 23, on which such an aluminum oxide layer does not exist, are coated with the coating layers 28A, 28B. Therefore, the positive electrode plate 20 is formed such that the metal aluminum which constitutes the aluminum main surfaces 23A, 23B is in direct contact with the coating layers 28A, 28B without interposition of an aluminum oxide layer.

In addition, the first coating layer 28A and the second coating layer 28B, which are made of tungsten carbide, have electrical conductivity (17 µΩ·cm) and high corrosion resistance to lithium ions. The film thicknesses TW of the first coating layer 28A and the second coating layer 28B are both 50 nm (see FIG. 4).

The first DLC film 29A and the second DLC film 29B are hard films containing carbon as a chief constituent and having SP2/SP3 bonds. These DLC films have high corrosion resistance like the first coating layer 28A and the second coating layer 28B. Therefore, in the positive electrode plate 20, good corrosion resistance can be imparted to the aluminum foil 23 thanks to the provision of the first coating layer 28A and the second coating layer 28B as well as the provision of the first DLC film 29A and the second DLC film 29B. It should be noted that the film thicknesses TD of the first DLC film 29A and the second DLC film 29B are both 100 nm.

The first positive active material layer 21A and the second positive active material layer 21B contain positive active material particles 22 consisting of $Li(Ni_{1/3}Mn_{1/3}Co_{1/3})O_2$, a conducting auxiliary agent (not shown) consisting of acetylene black, and a binding material (not shown) consisting of polytetrafluoroethylene. The weight ratio of these constituents in the first and second positive active material layers 21A, 21B is 87:10:3 (the positive active material 22:the conducting auxiliary agent:the binding material). The film thicknesses TM of the first positive active material layer 21A and the second positive active material layer 21B are both 45 µm.

The inventors evaluated the battery property (capacity maintaining ratio) of the above-described battery 1, using the battery 1.

The capacity of the unused (new) battery 1, which had not been stored for a long time after production, was firstly measured. Prior to the measurement, a charge and discharge cycle was repeated three times (for conditioning). In one cycle, the battery 1 was charged and discharged once within a voltage range of 3.0 to 4.1V with a constant current (0.10 A) at a temperature of 25° C.

Subsequently, the battery capacity was measured in the following way. That is, the battery 1 was charged from 3.4V to 4.5V with a current of 0.3 C. After the battery 1 was discharged to 2.5V with a constant current of 0.3 C at a temperature of 25° C., the capacity of the battery 1 was measured. The battery capacity measured at that time was regarded as the initial capacity.

The battery 1, which had undergone the above-described measurement, was subjected to a cycle test in which a cycle of charging and discharging was repeated within the voltage range of 2.5 to 4.1V with a constant current of 2 C at a temperature of 25° C. More specifically, a charge and a discharge were done in one cycle. Such a cycle was sequentially repeated 100 times and 400 cycles were done in total.

After every 100 cycle, the capacity of the battery 1 was measured in the same manner as described earlier. A capacity maintaining ratio of the battery 1 for each 100 cycle was calculated (i.e., the capacity maintaining ratio of the battery 1 was calculated after 100 cycles, 200 cycles, 300 cycles and 400 cycles). Note that this capacity maintaining ratio was obtained by dividing the value of the battery capacity measured after every 100 cycle by the above-mentioned initial capacity.

A comparative battery C1 was prepared in the same way as done for the battery 1. The battery property (capacity maintaining ratio) of the comparative battery C1 was measured in the same way as done for the battery 1.

The comparative battery C1 differs from the battery 1 in that the battery C1 employs a positive electrode plate in which the positive active material layers 21A, 21B are directly formed on the aluminum foil 23 similar to the aluminum foil of the positive electrode plate 20.

Figure 9:
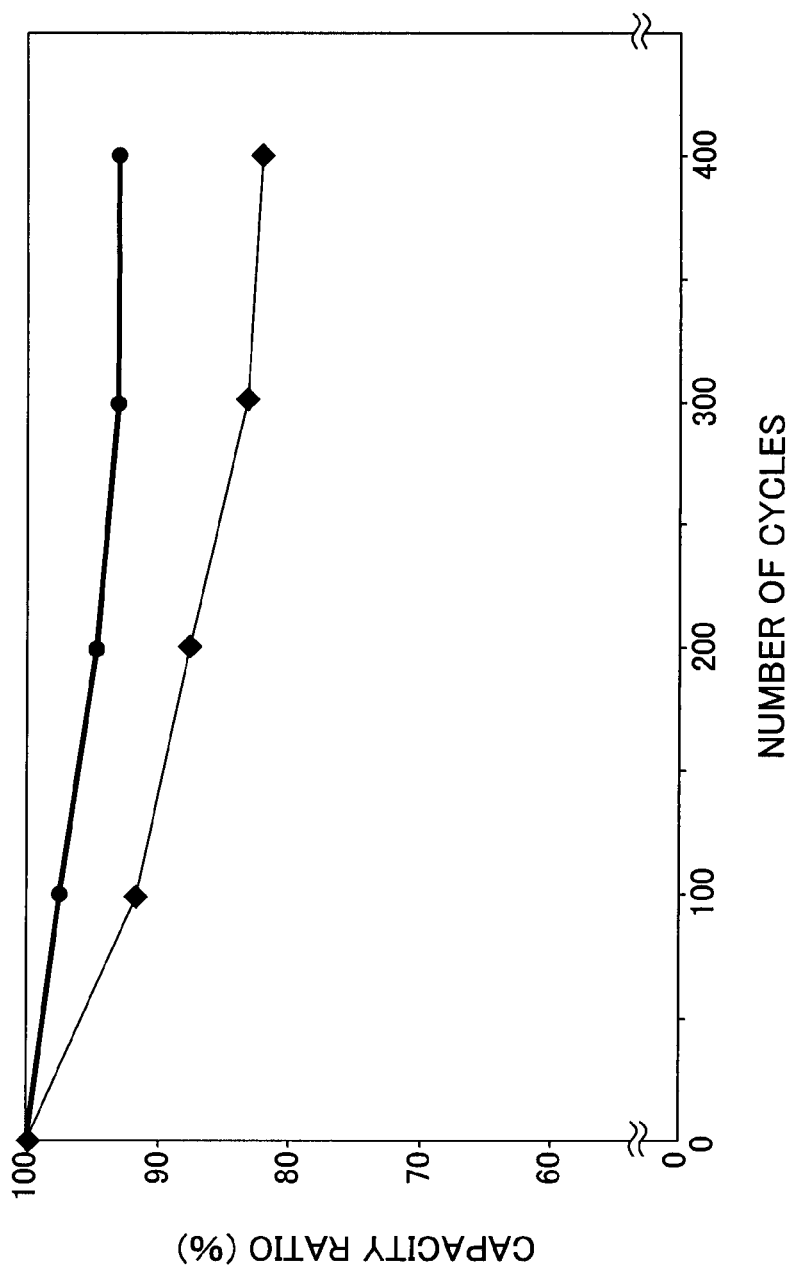
FIG. 9 is a graph showing a transition in capacity maintaining ratio according to the number of cycles.

FIG. 9 is a graph showing a transition in the capacity maintaining ratio of the battery 1 and a transition in the capacity maintaining ratio of the comparative battery C1, the capacity maintaining ratios changing according to the number of cycles. It is understood from FIG. 9 that the measurement values (obtained after 100, 200, 300 and 400 cycles) of the capacity maintaining ratio of the battery 1 are all higher than their counterparts of the comparative battery C1.

It is conceivable from the above result that nothing or an aluminum oxide layer having poor corrosion resistance exists between the aluminum foil 23 and the positive active material layers 21A, 21B in the positive electrode plate of the comparative battery C1. Conversely, in the positive electrode plate 20 of the battery 1, the coating layers 28A, 28B and the DLC films 29A, 29B, which have high corrosion resistance to lithium ions, are formed between the aluminum foil 23 and the positive active material layers 21A, 21B. Therefore, the aluminum foil 23 in the comparative battery C1 is thought to have been eroded by lithium ions during the cycle test so that the positive active material layers 21A, 21B formed on the aluminum foil 23 peeled off and separated from the aluminum foil 23. In contrast with this, in the battery 1, erosion of the aluminum foil 23 was prevented by the coating layers 28A, 28B and the DLC films 29A, 29B so that the peel-off and separation of the positive active material layers 21A, 21B due to the erosion could be avoided.

For the above reason, the battery 1 can more effectively prevent a decrease in battery capacity over time, compared to the comparative battery C1.

The inventors measured the resistance of the above-described positive electrode plate 20. Specifically, the resistance of the positive electrode plate 20 per unit area was measured, the positive electrode plate 20 having the coating layers 28A, 28B and the DLC films 29A, 29B between the aluminum foil 23 and the positive active material layers 21A, 21B.

Figure 10:
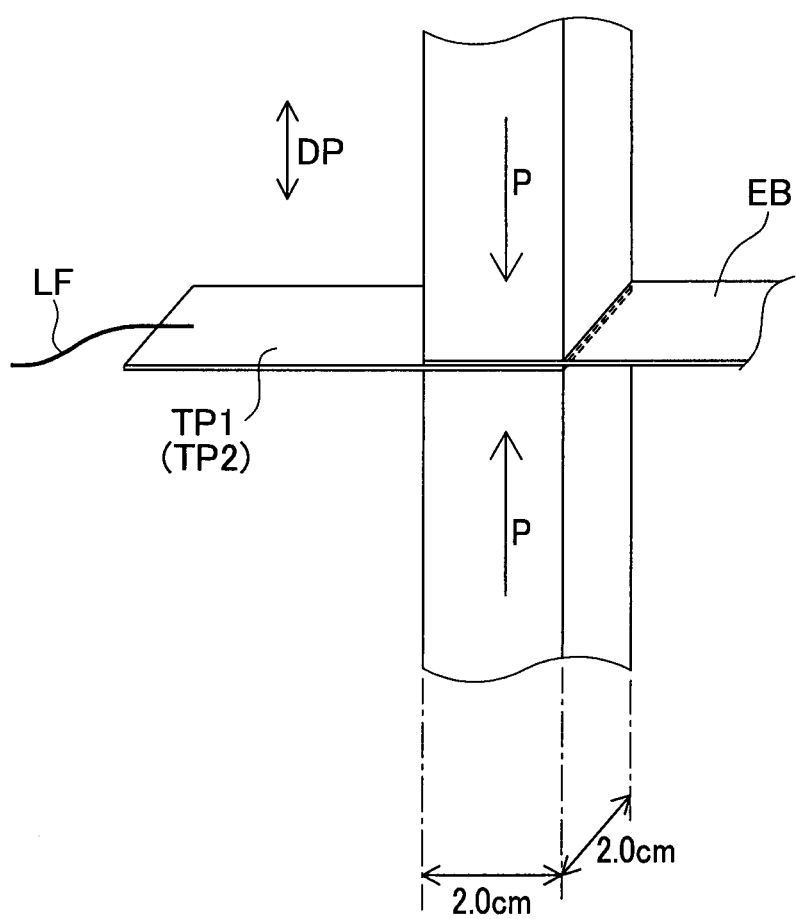
FIG. 10 is an explanatory view showing a resistance measuring test on the positive electrode plate.

More specifically, a test portion TP1 was prepared by cutting the positive electrode plate 20 into a ribbon-like strip having a width of 2.0 cm and connecting a conducting wire LF to this ribbon-like strip as shown in FIG. 10, while a 2.0 cm-wide ribbon-like metal foil EB similar to the test portion TP was prepared. The test portion TB1 and the metal foil EB were lapped over each other with contact faces having a size of 2.0 cm×2.0 cm. Then, the test portion TP1 and the metal foil EB were pressed along a lapping direction DP with a nipping/pressing device that had two flat surfaces and was capable of nipping and pressing the contact surfaces. Note that the nipping/pressing device nipped and pressed the contact faces with a pressing force (P) of 10 MPa/cm$^2$. Then, a current of 1.0 A was applied to the test portion TP1 through the conducting wire LF and the metal foil EB, while holding the test portion TP1 and the metal foil EB under pressure with the nipping/pressing device. From the voltage at that time, the value of resistance generated in the test portion TP1 was calculated.

As a comparative example, a test portion TP2 was prepared by cutting a positive electrode plate, in which the positive active material layers 21A, 21B were formed directly on the aluminum foil 23 similar to the aluminum foil of the positive electrode plate 20, into a 2.0 cm-wide ribbon strip and connecting the conducting wire LF to this strip. The resistance of the test portion TP2 was measured in the same way as done for the above-described test portion TP1.

It is understood from the result of the measurement that the resistance of the test portion TP1 is about 18% of the resistance of the test portion TP2 having the same layer thickness (45 μm) as of the test portion TP1. That is, the test portion TP1 has much lower resistance than the test portion TP2. From this fact, it is conceivable that an aluminum oxide layer was formed between the aluminum foil 23 and the positive active material layer 21A (21B) in the positive electrode plate of the test portion TP2. Meanwhile, in the positive electrode plate 20 of the test portion TP1, the coating layer 28A (28B) and the DLC film 29A (29B), which had higher electrical conductivity than the aluminum oxide layer, were interposed. That is, it is conceivable that, in the test portion TP1, the positive active material particles 22 contained in the positive active material layer 21A (21B) formed on the aluminum main surface 23A (23B) of the aluminum foil 23 could exchange electrons with the aluminum foil 23 at low resistance so that the positive electrode plate of the test portion TP1 could exhibit lower resistance than the positive electrode plate of the test portion TP2.

Therefore, the positive electrode plate 20 of the battery 1 according to the first embodiment is configured such that the coating layers 28A, 28B having electrical conductivity and corrosion resistance are formed between the aluminum foil 23 and the positive active material layers 21A, 21B without interposition of an aluminum oxide layer so as to directly coat the aluminum main surfaces 23A, 23B of the aluminum foil 23. This enables it to prevent the aluminum main surface portions 25A, 25B of the aluminum foil 23 from being eroded by the electrolyte 50. Therefore, in the battery 1 having the positive electrode plate 20, peel-off and separation of the positive active material layers 21A, 21B from the aluminum foil 23 can be avoided and, in consequence, a decrease in battery capacity over time due to the peel-off and separation can be prevented.

In addition, since the coating layers 28A, 28B have electrical conductivity, the positive active material particles 22 included in the positive active material layers 21A, 21B formed on the aluminum main surface portions 25A, 25B of the aluminum foil 23 can exchange electrons with the aluminum foil 23 at low resistance. Therefore, the positive electrode plate 20 can exhibit lower resistance than positive electrode plates in which an aluminum oxide layer is interposed between the positive active material layers 21A, 21B and the aluminum foil 23. The use of such a positive electrode plate 20 in the battery 1 enables the battery 1 to have low battery resistance.

Further, since the coating layers 28A, 28B of the positive electrode plate 20 are made from a carbide of tungsten (tungsten carbide), the positive electrode plate 20 is more inexpensive than positive electrode plates having coating layers made from, for instance, precious metal.

Such coating layers 28A, 28B both exhibit high corrosion resistance to lithium ions. Therefore, even if the positive electrode plate 20 is held at a positive potential when being in contact with the electrolyte 50, the positive electrode plate 20 will not be readily eroded but can exhibit good corrosion resistance.

In addition, the coating layers 28A, 28B both have hydrophilicity. This ensures that even if a water-based paste-like solvent containing the positive active material particles 22 dispersed therein is used for manufacture of the positive electrode plate 20, the paste will not be repelled but securely applied onto the coating layers 28A, 28B.

The coating layers 28A, 28B of the positive electrode plate 20 are made of tungsten carbide having electrical conductivity, which ensures that the positive electrode plate 20 has lower resistance than positive electrode plates having an aluminum oxide layer interposed between the positive active material layers 21A, 21B and the aluminum foil 23.

In the positive electrode plate 20, since the DLC films 29A, 29B are formed directly on the coating layers 28A, 28B, the positive electrode plate 20 can exhibit more improved corrosion resistance than positive electrode plates having only the coating layers 28A, 28B.

It is difficult to form the DLC films 29A, 29B directly on the aluminum main surfaces 23A, 23B of the aluminum foil 23 because the degree of adhesion between the aluminum foil 23 and the DLC films 29A, 29B is low. However, the DLC films 29A, 29B can be firmly adhered to the aluminum foil 23 by interposing the coating layers 28A, 28B made of tungsten carbide. As a result, the positive electrode plate 20 can exhibit reliable corrosion resistance.

Further, since the DLC films 29A, 29B are very thin, having a film thickness TD (=100 nm) within the range of from 0.5 to 100 nm, they are easy to form and the formation of the DLC films 29A, 29B has no influence upon stress (causing no crimp formation). This contributes to a reduction in the cost of the positive electrode plate 20.

The inventors measured the output of the battery 1 (in which the thickness TM of the positive active material layers 21A, 21B was 45 μm) in a fully charged state.

More specifically, the battery 1 was charged to 4.1V with a current of ⅓ C and then maintained at this voltage for 90 minutes at a temperature of 25° C. while gradually reducing the current value (constant current and constant voltage charge). In this way, the battery 1 was fully charged. The output (current×voltage) of the battery 1 in this condition was measured upon completion of 2 second-discharging of the battery 1 with a specified current (e.g., 5 C) at a temperature of 25° C.

Sample batteries P1, P2, P3, P4 and P5, which were different from the battery 1 in the thickness of the positive active material layers, were prepared (the layer thicknesses of P1, P2, P3, P4, P5 were 30 μm, 35 μm, 40 μm, 60 μm and 75 μm respectively). The outputs of the sample batteries P1 to P5 were measured in the same way as done for the battery 1.

Then, the output ratios of the battery 1 and the sample batteries P1 to P5 were calculated (the output ratio stated herein is the percentage when the output of the sample battery P1 having a positive electrode plate including 30 μm-thick positive active material layers is 100%). The output ratios were plotted as circle marks in the graph in FIG. 11 and a regression line LB was obtained based on these marks.

Meanwhile, comparative batteries C2 to C6 were prepared, which had a positive electrode plate including positive active material layers formed on a positive current collecting foil that differs from the battery 1 (the positive current collecting foil employed in the comparative batteries C2 to C6 is made of aluminum and has non-porous, flat main surfaces on which an aluminum oxide layer is formed). The thicknesses of the positive active material layers of the comparative batteries C2, C3, C4, C5 and C6 are 30 μm, 35 μm, 40 μm, 45 μm, and 50 μm respectively.

The outputs of the comparative batteries C2 to C6 were measured in the same way as done for the battery 1.

Then, the output ratios of the comparative batteries C2 to C6 were calculated (the output ratio stated herein is the percentage when the output of the comparative battery C2 having a positive electrode plate including 30 μm-thick positive active material layers is 100%). The output ratios were plotted as X marks in the graph in FIG. 11 and a regression line LA was obtained based on these marks.

Figure 11:
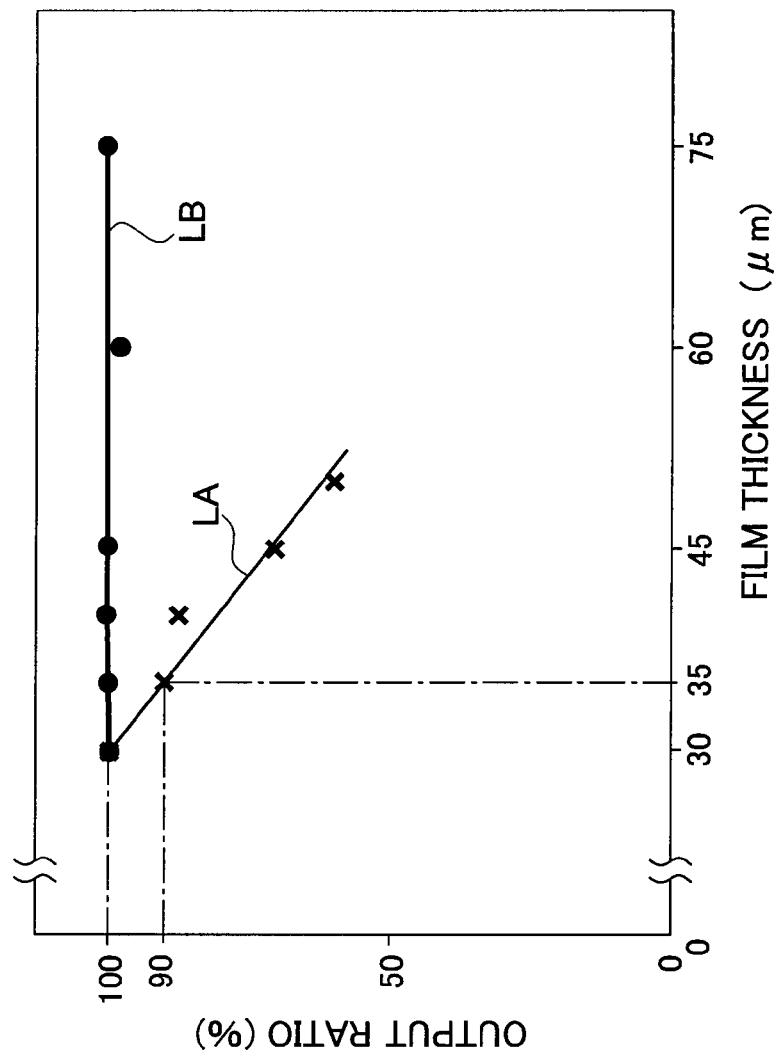
FIG. 11 is a graph showing a correlation between film thickness of a positive active material layer and output ratio of the battery.

It is understood from the regression line LA in FIG. 11 that, in the case of the comparative batteries C2 to C6, the battery output decreases in proportion to the increase of the thickness of the positive active material layers when the thickness of the positive active material layers is greater than 30 μm. It is understood from the regression line LB that, in the case of the battery 1 and the sample batteries P1 to P5, the battery output does not virtually vary even when the thickness of the positive active material layers is greater than 30 μm.

It is also understood from FIG. 11 that the output of the batteries C3-C6 is higher than that of the batteries 1, P2-P5 by 10% or more when the thickness of the positive active material layers is 35 μm or more. This means that, in cases where relatively-thick positive active material layers having a thickness of 35 μm or more is formed on a positive current collecting foil, the use of the aluminum foil 23 of the first embodiment, in which the main surface portions are porous and have the coating layers formed thereon, makes it possible to significantly improve the output of the battery (by 10% or more) compared to batteries having a positive current collecting foil which includes non-porous, flat main surface portions on which a passive layer is formed.

As to a sample battery in which the thickness of the positive active material layers is greater than 75 μm and is, more particularly, 80 μm, the positive active material layers themselves were cracked owing to the stress generated when forming the positive active material layers in the course of manufacture.

In view of the above result, the thickness TM of the positive active material layers 21A, 21B in the battery 1 of the first embodiment is determined to be 45 μm that falls within the range of 35 to 75 μm. Thanks to this, the battery 1 can be more significantly improved in output property compared to the battery (i.e., the comparative battery C5) having the positive electrode plate in which the positive active material layers have the same thickness (=45 μm) but the main surface portions are not porous but flat and in which a passive layer is formed on the main surface portions.

In addition, the output of the battery 1 does not virtually fluctuate even if the thickness TM of the positive active material layers 21A, 21B is varied within the above range. It is therefore possible to maintain the performance (battery capacity and output) of the battery 1 even if the coated area is reduced while not altering the amount of the positive active material particles 22 used for one battery and increasing the thickness TM of the positive active material layers 21A, 21B. Accordingly, the area of the positive active material layers 21A, 21B can be reduced and, in proportion to the reduction of the area of the layers 21A, 21B, the area of the aluminum foil 23 and the coating layers 28A, 28B can be reduced. Consequently, the weight and cost of the battery 1 can be reduced while lowering the resistance of the battery 1.

In addition, since the thickness TM is set to 75 μm or less, cracking of the positive active material layers 21A, 21B due to the stress generated during manufacture of the battery can be prevented.

Next, a method of manufacturing the battery 1 according to the present embodiment will be described with reference to the drawings.

The aluminum foil 23 used in the process of manufacturing the battery 1 has been subjected to AC etching beforehand. Specifically, an ordinary aluminum foil, to which a known AC etching treatment has been applied thereby to make the first aluminum main surface portion 23A and the second aluminum main surface portion 23b porous, is used as the aluminum foil 23.

Note that the aluminum oxide layer formed on the main surfaces of the aluminum foil is removed by AC etching so that metal aluminum is exposed at the aluminum main surfaces 23A, 23B of the aluminum foil 23. That is, the aluminum foil 23 does not have an aluminum oxide layer on the aluminum main surfaces 23A, 23B.

Figure 12:
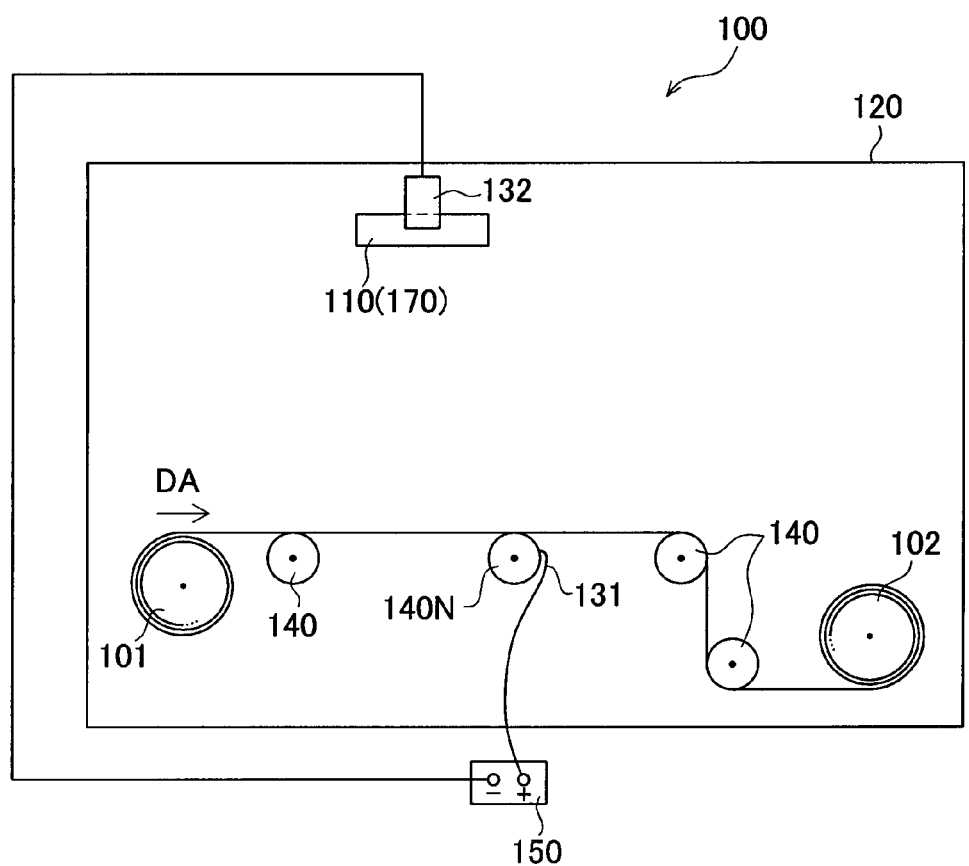
FIG. 12 is an explanatory view of a coating process in the first embodiment.

Next, reference is made to FIG. 12 to describe the process of coating the aluminum main surfaces 23A, 23B of the aluminum foil 23 with the first and second coating layers 28A, 28B.

In this coating process, a sputtering system 100 shown in FIG. 12 is used. This sputtering system 100 has, in a vacuum container 120, a wind-off part 101 and wind-up part 102 for the aluminum foil 23, a target 110 made from tungsten carbide (WC), an anode terminal 131, a cathode terminal 132, a plurality of auxiliary rollers 140, a conductive auxiliary roller 140N and a power supply 150.

Of these components, the vacuum container 120 is designed to exhaust the air from the container, using a vacuum pump (not shown). Thereafter, the vacuum container 120 is charged with a small amount of argon gas.

Within the vacuum container 120, the aluminum foil 23 is reeled out from the wind-off part 101 and then moved in the longitudinal direction DA by means of the plurality of auxiliary rollers 140 and the conductive auxiliary roller 140N to be taken up by the wind-up part 102. The conductive auxiliary roller 140N is made from a metal and conductible with the aluminum foil 23. Since the conductive auxiliary roller 140N is electrically connected to the positive terminal 131 of the power supply 150, the whole of the aluminum foil 23 is allowed to assume a positive potential by applying voltage from the power supply 150.

In the coating process, the aluminum foil 23 is moved in the longitudinal direction DA from the wind-off part 101 and voltage is applied to the aluminum foil 23 from the power supply 150. Thereby, the aluminum foil 23 is charged to a positive potential whereas the target 110 made from tungsten carbide being charged to a negative potential, so that tungsten carbide derived from the target 110 deposits on the first aluminum main surface 23A (or the second aluminum main surface 23B) of the aluminum foil 23. Thus, the first aluminum main surface 23A (or the second aluminum main surface 23B) is coated with the first coating layer 28A (or the second coating layer 28B).

The other main surface of the aluminum foil 23 is coated in a similar way, and accordingly, the main surfaces 23A, 23B of the aluminum foil 23 are directly coated with the coating layers 28A, 28B.

Then, the target 110 of the above-described sputtering system 100 is replaced by a target 170 made from graphite and the DLC films 29A, 29B are formed on the coating layers 28A, 28B respectively.

Then, a paste (not shown) containing the positive active material particles 22 is applied onto the DLC films 29A, 29B with a known technique, followed by drying and compression, so that the positive electrode plate 20, having the positive active material layers 21A, 21B on the aluminum main surface portions 25A, 25B of the aluminum foil 23, is formed (see FIGS. 3, 4).

The paste described above is prepared by mixing the positive active material particles 22, a conducting auxiliary agent and a binding material and dispersing this mixture in ion-exchange water AQ. Since the coating layers 28A, 28B both have hydrophilicity, the paste will not be repelled but can be securely applied onto the coating layers 28A, 28B.

Meanwhile, the negative electrode plate 30 prepared by the known technique and the positive electrode plate 20 are wound with the separator 40 interposed therebetween, thereby forming the power generating element 10.

Thereafter, the positive current collector 91 and the negative current collector 92 are welded to the positive electrode plate 20 (the aluminum foil 23) and the negative electrode plate 30 (the copper foil 33) respectively. Subsequently, these electrode plates are inserted into the battery case body 81. After the battery case body 81 is filled with the electrolyte 50, the sealing lid 82 is welded to the battery case body 81 for sealing. In this way, the battery 1 is produced (see FIG. 1).

In the method of manufacturing the battery 1 in the first embodiment, the coating layers 28A, 28B are formed directly on the aluminum main surface portions 25A, 25B of the aluminum foil 23 on which no aluminum oxide layer is formed. Therefore, the positive electrode plate 20 can be produced which has the electrically conductive and corrosion-resistant coating layers 28A, 28B that are formed between the aluminum foil 23 and the positive active material layers 21A, 21B so as to directly coat the aluminum main surfaces 23A, 23B of the aluminum foil 23 without interposition of an aluminum oxide layer. That is, it is possible to produce the positive electrode plate 20 which exhibits lower resistance than a positive electrode plate having an aluminum oxide layer between the positive active material layers 21A, 21B and the aluminum foil 23, while preventing a decrease in battery capacity over time caused by corrosion (and by the subsequent peel-off and separation of the positive active material layers 21A, 21B).

Second Embodiment

Figure 13:
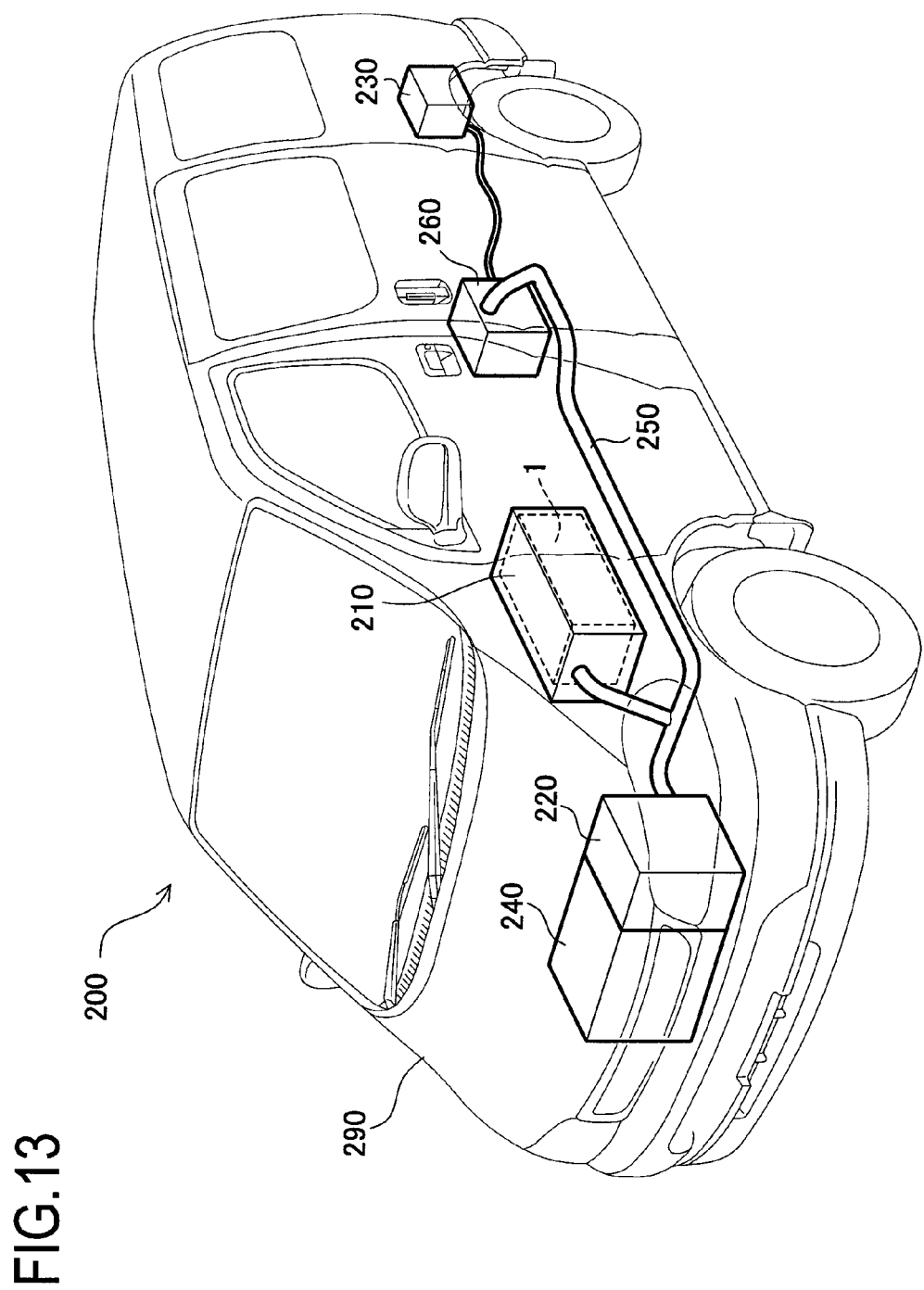
FIG. 13 is an explanatory view of a vehicle in a second embodiment.

A vehicle 200 in a second embodiment is equipped with a battery pack 210 composed of a plurality of the above-described batteries 1. Specifically, the vehicle 200 is a hybrid car that is driven by an engine 240 in combination with a front motor 220 and a rear motor 230, as shown in FIG. 13. The vehicle 200 has a vehicle body 290, the engine 240, the front motor 220 attached to this, the rear motor 230, a cable 250, an inverter 260 and the battery pack 210 in the form of a rectangular box. Of these parts, the battery pack 210 has a plurality of the above-described batteries 1 accommodated therein.

The vehicle 200 of the second embodiment is mounted with the batteries 1 capable of exhibiting low resistance while preventing a decrease in battery capacity over time and therefore has good traveling properties.

Third Embodiment

Figure 14:
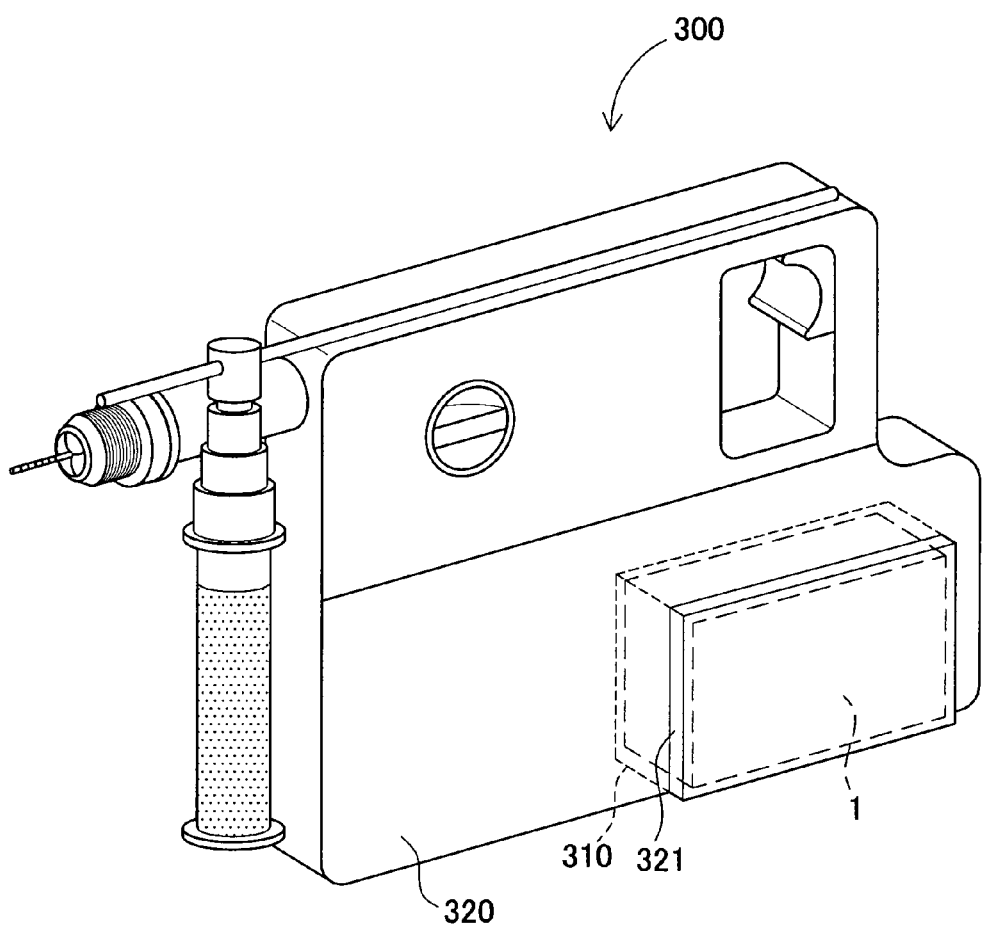
FIG. 14 is an explanatory view of a battery-mounting device in a third embodiment.

A hammer drill 300 in a third embodiment is a battery-mounting device equipped with a battery pack 310 including the above-described batteries 1 and a main body 320 as shown in FIG. 14. The battery pack 310 is placed in a bottom part 321 of the main body 320 of the hammer drill 300.

The hammer drill 300 in the third embodiment is mounted with the batteries 1 capable of exhibiting low resistance while preventing a decrease in battery capacity over time and therefore possesses a driving energy source having stable performance.

Although the invention has heretofore been described according to the first to third embodiments, it is apparent that the invention is not necessarily limited to the particular embodiments shown herein and various changes and modifications are made to the disclosed embodiments without departing from the scope of the invention.

While the battery case of the battery is a rectangular storage container in the first embodiment, it may be a cylindrical or laminated storage container. The coating layers of the battery electrode foil are made of tungsten carbide (WC) in the first embodiment. However, the coating layers may be made from any of other tungsten carbides than WC (e.g., $W_3C$), tantalum carbides (e.g., TaC), hafnium carbides (e.g., HfC), niobium carbides (e.g., $Nb_2C$ and NbC) and vanadium carbides (e.g., VC). Also, they may be made from any of tungsten oxides (e.g., $WO_3$ and $W_2O_3$), tantalum oxides (e.g., $TaO_2$), hafnium oxides (e.g., $HfO_2$), niobium oxides (e.g., NbO and $Nb_2O_5$) and vanadium oxides (e.g., VO, $V_2O_3$, and $VO_2$). Further, they may be made from any of precious metals such as gold and platinum.

The first embodiment has been described with a positive electrode plate having a positive current collecting foil the main surfaces of which are porous whereas its foil central portion is solid. However, a positive current collecting foil, which is porous not only at its main surface portions but also at its foil central portion located between the main surface portions, could be used.

Although the main surfaces of the positive current collecting foil are coated with the coating layers by sputtering in the first embodiment, they may be coated by other techniques than sputtering. Examples of such techniques include physical vapor deposition (PVD) methods such as vacuum deposition and ion plating and chemical vapor deposition methods (vapor phase epitaxial methods) such as CVD. In cases where the coating layers are made of a precious metal such as gold or platinum, the main surfaces of the positive current collecting foil may be coated by plating.

The invention claimed is:

1. A positive electrode plate for a lithium ion secondary battery, the positive electrode plate comprising:
   a positive current collecting foil made of aluminum, in which at east a main surface portion constituting a main surface is porous; and
   a positive active material layer containing positive active material particles and being formed on the main surface portion of the positive current collecting foil,
   wherein a coating layer consisting of tungsten carbide, having electrical conductivity and corrosion resistance, is formed between the positive current collecting foil from which an aluminum oxide layer made of aluminum oxide having been formed on the main surface is removed and the positive active material layer to directly coat the main surface of the positive current collecting foil without interposition of an aluminum oxide layer made of aluminum oxide, and
   wherein a diamond-like carbon film is directly formed on the coating layer.

2. A lithium ion secondary battery comprising:
   a power generating element including the positive electrode plate for a lithium ion secondary battery according to claim 1; and
   an electrolyte including lithium ions.

3. The lithium on secondary battery according to claim 2, wherein the positive active material layer has a thickness of 35 to 75 µm.

4. A vehicle equipped with the lithium ion secondary battery according to claim 2, the vehicle being configured to use electric energy stored in the lithium ion secondary battery as the whole of or part of a driving power source.

5. A vehicle equipped with the lithium on secondary battery according to claim 3, the vehicle being configured to use electric energy stored in the lithium ion secondary battery as the whole of or part of a driving power source.

6. A battery-mounting device equipped with the lithium ion secondary battery according to claim 2, the battery-mounting device being configured to use electric energy stored in the lithium ion secondary battery as the whole of or part of a driving energy source.

7. A battery-mounting device equipped with the lithium on secondary battery according to claim 3, the battery-mounting device being configured to use electric energy stored in the lithium on secondary battery as the whole of or part of a driving energy source.

8. A method of manufacturing a positive electrode plate for a lithium ion secondary battery, the positive electrode plate comprising:
   a positive current collecting foil made of aluminum, in which at least a main surface portion constituting a main surface is porous;
   a positive active material layer containing positive active material particles and being formed on the main surface portion of the positive current collecting foil; and
   a coating layer consisting of tungsten carbide, having electrical conductivity and corrosion resistance, being formed between the positive current collecting foil and the positive active material layer to directly coat the main surface of the positive current collecting foil without interposition of an aluminum oxide layer made of aluminum oxide,
   the method comprising the steps of directly coating the main surface of the positive current collecting foil from which an aluminum oxide layer having been formed on the main surface is removed with the coating layer, and directly forming a diamond-like carbon film on the coating layer.

* * * * *